(No Model.) 2 Sheets—Sheet 1.
W. T. LINTNER.
BEARING FOR SPEED INDICATORS.
No. 520,792. Patented June 5, 1894.
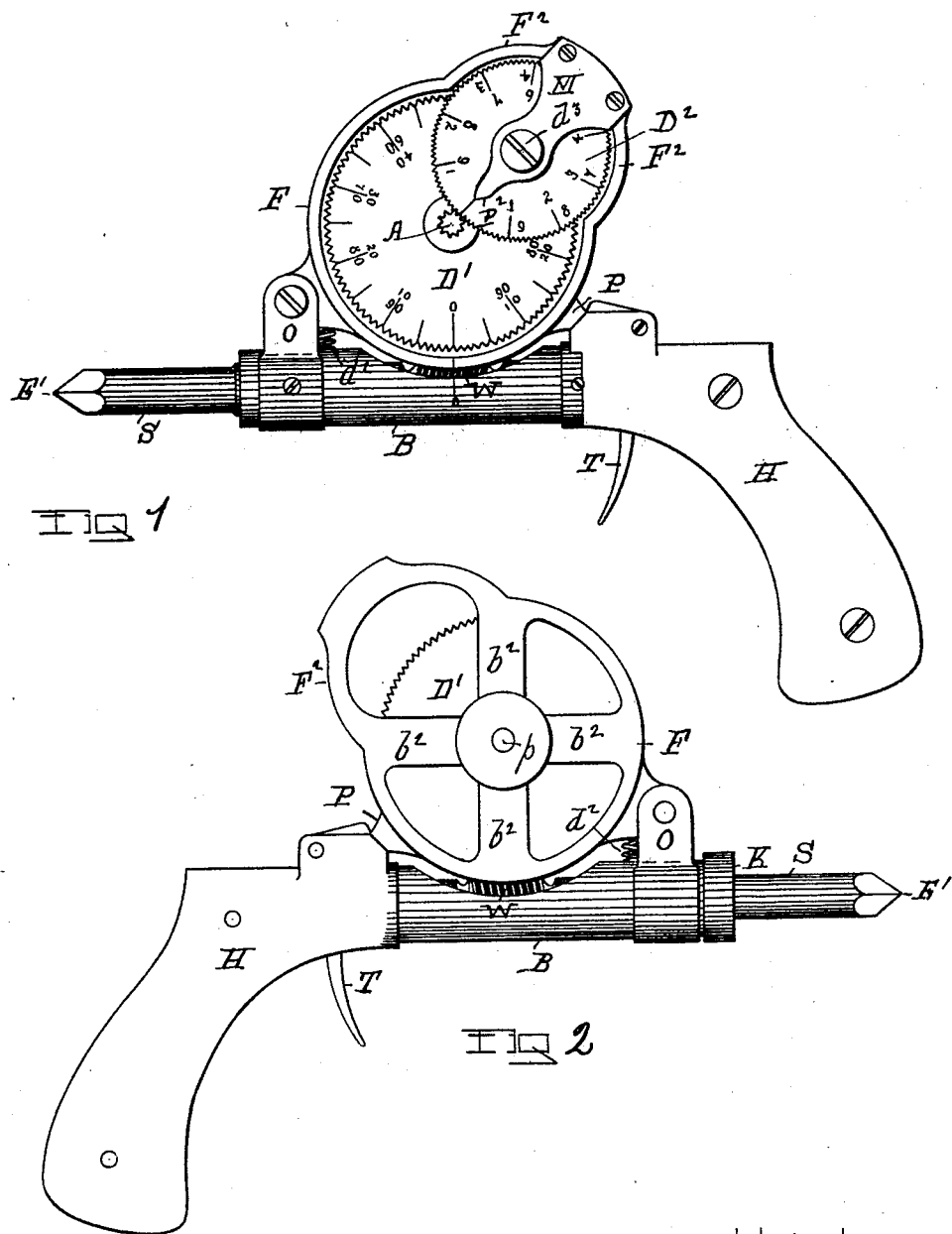
WITNESSES
Charles D. Brintnall
William A. Sweet
INVENTOR
William T. Lintner
by W. E. Hagan atty (No Model.) 2 Sheets—Sheet 2.
W. T. LINTNER.
BEARING FOR SPEED INDICATORS.
No. 520,792. Patented June 5, 1894.
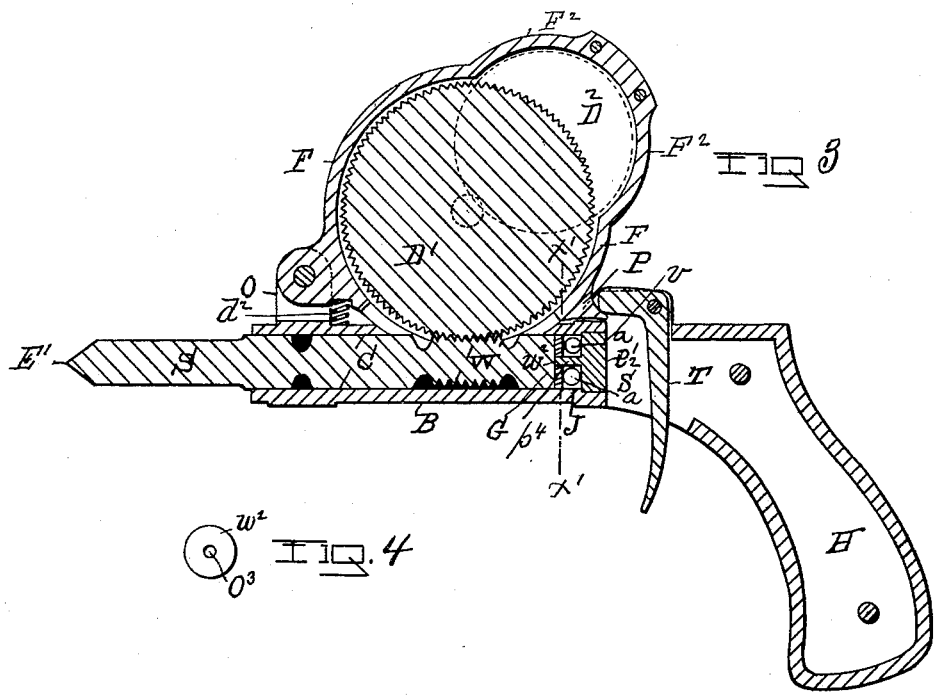

UNITED STATES PATENT OFFICE.

WILLIAM T. LINTNER, OF GLOVERSVILLE, NEW YORK, ASSIGNOR OF ONE-HALF TO W. L. SPORBORG, OF SAME PLACE.

BEARING FOR SPEED-INDICATORS.

SPECIFICATION forming part of Letters Patent No. 520,792, dated June 5, 1894.

Application filed July 31, 1893. Serial No. 481,974. (No model.)

*To all whom it may concern:*

Be it known that I, WILLIAM T. LINTNER, of Gloversville, Fulton county, State of New York, have invented a new and useful Improvement in Speed-Indicators, of which the following is a specification.

My invention relates to improvements in speed indicators, and these improvements have for their object the taking up by frictional bearings of the spindle end-thrust. When the spindle of speed indicators is by contact pressure made to engage with a revolving shaft, all the pressure applied to produce this contact reacts on the bearing end of the spindle where opposite to the contact end; and this end thrust interferes with the prompt action of the spindle, and causes it to not only grind off at the contact end, but interfere with its prompt movement, and the registration of the dials which it operates.

I have shown my improvement as applied to that speed indicator shown and described in Letters Patent No. 413,441, dated December 31, 1889, and also that improvement upon the latter shown and described in an application filed January 5, 1893, Serial No. 357,345, and now pending; although it may be applied to any form of speed indicator wherein a spindle is used, to make a contact engagement, so as to be moved synchronously with a revolving shaft and by its rotation operate a registering dial.

Accompanying this specification to form a part of it are two plates of drawings containing four figures illustrating the application of my invention to a speed indicator, with the same designation of parts by letter reference used in all of them.

Of the illustrations Figure 1 is a side elevation of a speed indicator showing my improvement, with its dial face side shown as facing the view. Fig. 2 is another side elevation of the speed indicator shown at Fig. 1, with the side that is opposite to that containing the dial face fronting the sight, and exteriorly illustrating a modified form of ball bearing. Fig. 3 is a central vertical section taken from end to end of the speed indicator shown at Fig. 1. Fig. 4 shows a washer used in connection with the ball bearing illustrated at Fig. 3.

The several parts of the apparatus thus illustrated are designated by letter reference and the function of the parts is described as follows:

The letter B designates the stock made with a pistol-form handle H, containing a tubular chamber or socket C, constructed to receive the spindle S.

The letter O designates an offset made from the stock, and F a dial frame, that is pivoted thereto. This frame F on its side opposite to where thus pivoted is made with a projection P, and the letter T designates a trigger-form lever, that is arranged within a slot $S^2$, made in the stock in advance of the handle, and thereat pivoted. The upper end of this trigger-form lever is made to have an inverted L-form so that it will lap over the projection P, on the frame F, and when the trigger end is drawn rearwardly, it will engage with the projection P, and draw down the frame F, against the force of the spring $d^2$, arranged between the stock and the offset O on the frame.

The letter D' designates a dial-wheel made with a geared outer edge, and arranged to turn on a pintle shaft $p$, that is secured to the center of the dial-wheel, and has its bearings in the cross-bars $b^2$, $b^2$, in the back of the frame in which to journal. This dial wheel D' is radially graduated to indicate units and tens of revolutions.

The letter $F^2$ designates an offset made to the frame F, and the letter $D^2$ designates another dial wheel arranged to turn on a pintle shaft $d^3$, arranged in a pointer plate M, which at its outer edge is attached to the edge of the frame offset $F^2$, and therefrom extends downwardly outside of the dial wheel $D^2$, and this pointer plate is made at its lower end with a pointer proper designated at $P^2$. This dial wheel $D^2$, is graduated radially to indicate hundreds of revolutions, and is operated by a spur-wheel A, arranged on, so as to turn with the dial wheel D', and to mesh into the geared outer edge of the dial wheel $D^2$, and to actuate the latter to move one point at each revolution of the dial wheel D'.

The spindle S, is constructed with a worm-gear W and is arranged to journal in the socket of chamber C, and it is caused to engage with the perimetrical gears on the dial-wheel D′, by the action of the trigger-form lever as before described. All of the before named parts considered alone or in combination with each other are shown and described in the older patent, and the application for Letters Patent before named and are not my invention.

The letter J, designates a ball bearing that consists of a series of balls $a$, arranged at the rear end $e′$, of the socket C, around a pin $p^4$, that is projected outwardly from the face of the plug $v$, located at the inner end of the socket C, and the letter $w^2$, designates a washer, having a central passage $o^3$, for the pin $p^4$, against the outer face of which washer the inner end G, of the spindle bears when the contact end E′ of the latter is pressed against the center of, and at the end of a revolving shaft. When thus constructed the pressure upon the spindle as reacting upon the inner end of the latter, is in turn by the washer $w^2$, transferred to the balls $a$, and which reduces the friction and makes the action of the spindle more prompt.

To the ball-bearings shown apart from their construction to adapt them to their combination with the spindle of a speed indicator I make no claim.

Having thus described my invention, what I claim, and desire to secure by Letters Patent, is—

1. The combination with the spindle of a speed indicator that is actuated by a contact pressure with a revolving shaft, and by means of which a worm gear on said spindle transmits motion to a registering dial wheel, substantially as described; of a socket bearing for said spindle; the pin $p^4$, projected laterally from the inner end of said socket bearing; the balls $a$, arranged around said pin; and a washer G, arranged between the said balls and the inner end of the revolving spindle, substantially as and for the purposes set forth.

2. The combination with the spindle of a speed indicator, that is provided with a socket formed in a stock in which to turn, and which spindle is actuated by contact pressure with a revolving shaft, of the plug $v$, made with the projecting pin $p^4$, arranged in the inner end of said socket; the balls $a$, arranged around said pin; and the washer G, arranged between said balls and the inner end of said spindle, substantially in the manner as and for the purposes set forth.

Signed at Gloversville this 24th day of January, 1893, and in the presence of the two witnesses whose names are hereto written.

WILLIAM T. LINTNER.

Witnesses:
OLIVER GETMAN,
JOHN L. GETMAN.